UNITED STATES PATENT OFFICE.

MICHAEL F. COUGHLIN, OF STOUGHTON, MASSACHUSETTS, AND CHARLES E. SWETT, OF PROVIDENCE, RHODE ISLAND, ASSIGNORS TO FREDERIC H. KENNARD, OF NEWTON CENTER, MASSACHUSETTS.

FINISHING COMPOSITION AND METHOD OF PREPARING SAME.

1,114,119.     Specification of Letters Patent.     Patented Oct. 20, 1914.

No Drawing.     Application filed September 22, 1913. Serial No. 791,198.

*To all whom it may concern:*

Be it known that we, (1) MICHAEL F. COUGHLIN and (2) CHARLES E. SWETT, citizens of the United States of America, residing at (1) Stoughton and (2) Providence, in the counties of (1) Norfolk and (2) Providence and States of (1) Massachusetts and (2) Rhode Island, have invented certain new and useful Improvements in Finishing Compositions and Methods of Preparing Same, of which the following is a specification.

This invention relates to compositions suitable for use as a leather dressing or polish and for other purposes, herein generically termed "finishing compositions." The composition contains as essential components a waxy body, and the constituents of waste sulfite liquor, with which may be incorporated a water-soluble soap and an alkaline substance, preferably an alkali-metal carbonate. Waste sulfite liquor is the effluent from the digesters in the sulfite process of making pulp.

In preparing the composition, waste sulfite liquor is preferably evaporated, and intimately compounded, either as a heavy liquid or mass or in the form of a dry powder with a suitable wax. The evaporated sulfite liquor serves as an adhesive, and imparts to the dry finish a decided luster. By reason of the low cost of the sulfite liquor, very cheap and effective finishing compositions may thus be prepared.

Suitable waxy bodies are Montan wax, carnauba wax, hard white wax, ceresin, and other bodies of similar or technically equivalent character. The soap may be incorporated as such or it may be formed in the mixture by the reaction of a fatty acid with a suitable alkali. Color may be imparted to the composition by the addition thereto of suitable dyes or pigments.

It is preferred to introduce into the composition a slight excess of a suitable alkali, such as sodium carbonate, which reacts with the lime salts present in the sulfite liquor in such manner as to correct any hardness which might be occasioned thereby.

The composition may take the form of a liquid, in which case it is essentially an emulsion of the wax in an aqueous solution of the constituents of the sulfite liquor, with the optional addition of the dissolved soap; or it may be a dry powder, which is readily emulsified on addition of water.

Illustrative embodiments of the invention are as follows, it being understood that the invention is not limited to the particular proportions or operating conditions specified by way of example:—Melt together one ounce of Montan wax and ¼ ounce of stearic acid, and when melted add one fluid ounce of water containing ⅛ ounce of sodium carbonate in solution. Stir vigorously until the emulsion is formed; then add four ounces of dry evaporated waste sulfite liquor, or eight ounces of evaporated waste sulfite liquor containing fifty per cent. of water. The sulfite liquor should preferably be rendered slightly alkaline by the addition of sufficient sodium carbonate or other suitable alkali. This composition, after cooling, is suitable for use; or it may be further diluted with water; or it may be evaporated to dryness, the dry composition thus obtained being, preparatory to application to the leather or other surface to be treated, again emulsified in presence of water. The composition may also be prepared in a dry form by intimately mixing powdered wax, powdered soap, and dry evaporated sulfite pitch, together with sufficient sodium carbonate or equivalent alkali to render this pitch slightly alkaline; or the powdered soap may be replaced by powdered fatty acid, together with the necessary proportion of powdered adkali to combine therewith.

We claim:—

1. A finishing composition containing a waxy body intimately compounded with the constituents of waste sulfite liquor, the waxy body in sufficient proportion to form a composition readily emulsifiable with water.

2. A finishing composition containing a waxy body intimately compounded with a soluble soap and with the constituents of waste sulfite liquor.

3. A finishing composition containing a waxy body intimately compounded with a soluble soap, an alkaline substance and the constituents of waste sulfite liquor.

4. A finishing composition in the form of an emulsion containing a waxy body, and the constituents of waste sulfite liquor.

5. A finishing composition in the form of an emulsion containing a waxy body, a soluble soap, and the constituents of waste sulfite liquor.

6. A finishing composition in the form of an emulsion containing a waxy body, a soluble soap, an alkaline substance, and the constituents of waste sulfite liquor.

7. The herein-described method of preparing a finishing composition, which consists in emulsifying a waxy body in presence of the dissolved constituents of waste sulfite liquor.

8. The herein-described method of preparing a finishing composition, which consists in emulsifying a waxy body in presence of a soluble soap and the dissolved constituents of waste sulfite liquor.

9. The herein-described method of preparing a finishing composition, which consists in emulsifying a waxy body, in presence of a soluble soap, an alkaline substance, and the dissolved constituents of waste sulfite liquor.

In testimony whereof, we each affix our signatures in presence of two witnesses.

MICHAEL F. COUGHLIN.
CHARLES E. SWETT.

Witnesses:
ROBERT BROWN METCALF,
HARRY S. MON,
E. A. SHERMAN,
V. E. NUNEZ.